No. 755,483. PATENTED MAR. 22, 1904.
A. HAMILTON.
GATE FOR FRUIT CHUTES.
APPLICATION FILED FEB. 14, 1903.
NO MODEL.
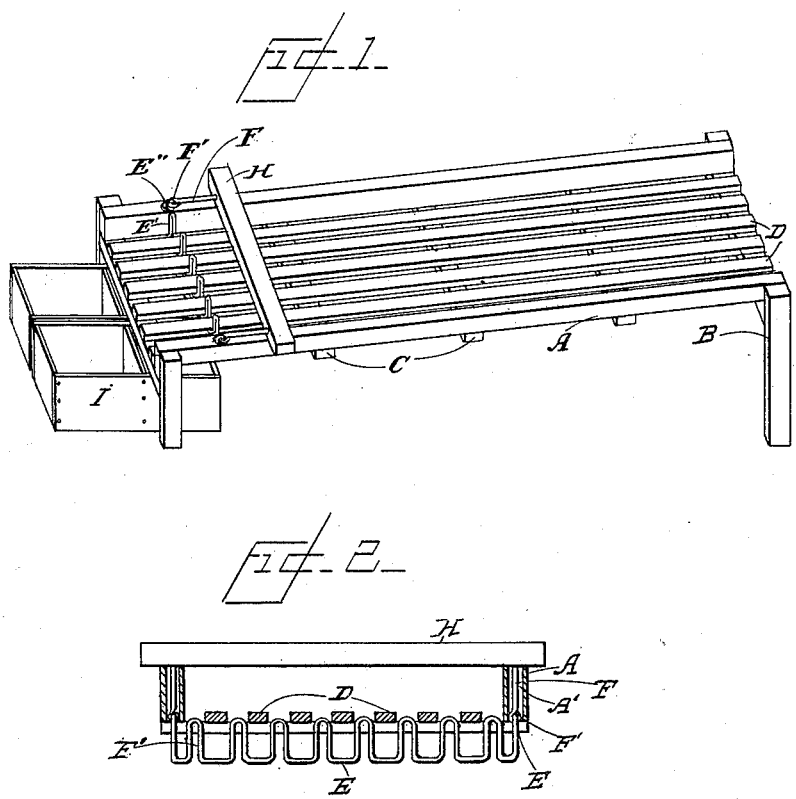
Witnesses
Geo. E. Winton
Mo. C. Nickelson
Inventor.
Alexander Hamilton
by Hazard & Harpham
Attorneys.

No. 755,483. Patented March 22, 1904.

UNITED STATES PATENT OFFICE.

ALEXANDER HAMILTON, OF ALHAMBRA, CALIFORNIA.

GATE FOR FRUIT-CHUTES.

SPECIFICATION forming part of Letters Patent No. 755,483, dated March 22, 1904.

Application filed February 14, 1903. Serial No. 143,454. (No model.)

*To all whom it may concern:*

Be it known that I, ALEXANDER HAMILTON, a citizen of the United States, residing at Alhambra, in the county of Los Angeles and State of California, have invented new and useful Improvements in Gates for Fruit-Chutes, of which the following is a specification.

In the citrus-fruit industry when carried on near the Pacific coast the fruit is frequently covered with smut, which must be washed off before the fruit is in proper condition to be sent to market. Machines are provided in which this smut and other dirt is washed off the fruit. After the fruit is washed in such machine it is run off into racks, where it is permitted to dry. These racks are large enough to hold several boxes of fruit and are placed on such a slant that when the gate at the lower end is opened the fruit will roll into boxes placed to receive it.

The object of my invention is to provide a gate for such rack that can be easily controlled by the operator and which can be opened and closed without injuring the fruit. I accomplish this object by the gate described herein and illustrated in the accompanying drawings, in which—

Figure 1 is a perspective view of a fruit-rack provided with one of my improved gates in its closed position. Fig. 2 is a cross-section of the rack on a line just in front of the gate, with the gate shown in its open position.

In the drawings, A denotes the side rails supported by legs B. Secured to cross-bars C, affixed to the side rails, are the slats D, upon which the fruit rests when it is drying. Near the lower end of the rack is a gate composed of the finger-bar E, which is preferably formed of a light iron rod bent into corrugations, as shown in Fig. 2, to form fingers E', which pass between the slats. The ends are bent to form eyes E'', which interlock with like eyes F' on the ends of rods F, which rods pass through holes A' in the side rails and are secured to a wooden handle or cross-bar H. These rods and cross-bar form a bail or handle by means of which the gate is operated. When the gate is open, it hangs in the position shown in Fig. 2. When the operator wishes to close the gate, he catches the bail and raises it until the eyes of the gate are on a level with the top of the side rails and then turns the bail down until the bar H rests on the top of the side rails, as shown in Fig. 1. To open the gate, the bail is raised until the joint between it and the gate will pass through the holes in the side rails, when it is lowered until the bar H rests on the side rails, when the fruit rolls into boxes I.

Instead of using an iron rod to form the gate, wooden fingers adapted to pass up between the slats secured to a finger-bar could be used; but, on account of lightness, smoothness, and strength, iron is preferred.

My gate may be used in any fruit-chute as well as in drying-rack, the drying-rack being a fruit-chute in which the fruit is held while being dried.

Having described my invention, what I claim as new, and desire to secure by Letters Patent, is—

1. In a fruit-chute a gate therefor comprising a finger-bar having a plurality of fingers adapted to pass up through the bottom of the chute to stop the passage of the fruit therethrough; a bail flexibly joined to the ends of said finger-bar; said bail being adapted to be turned upon the top of the chute to hold the gate in its closed position.

2. In a fruit-drying chute having side and a slatted bottom, a gate therefor comprising a finger-bar having a plurality of fingers adapted to pass between the slats of the bottom; and means to elevate said gate comprising a bail passing transversely across said slats, operatively secured to said finger-bar at the outer ends thereof and adapted to be turned at an angle to said fingers when they are elevated through the slats to their highest position and lock said fingers in said position.

3. In a fruit-drying chute having inclined slats on which to rest the drying fruit; a gate therefor comprising a finger-bar; a plurality of fingers adapted to pass between the slats and prevent the fruit from running down the chute when in an elevated position and arranged to permit the fruit to run down the chute when in the depressed position, means to depress and elevate the fingers comprising the transversely-attached handle-bar, swingingly secured to the finger-bar substantially as shown and described.

4. In a fruit-drying chute of the character herein described a cut-off gate therefor comprising a single transverse finger-bar disposed below the chute near the outlet thereof and having a plurality of fingers projecting upwardly therefrom adapted to pass up between the slats in the chute in closing the gate and to be dropped down below the line of the slats in opening the gate; and means to elevate said finger-bars and fingers and lock them in their elevated position.

In witness that I claim the foregoing I have hereunto subscribed my name this 6th day of February, 1903.

ALEXANDER HAMILTON.

Witnesses:
E. F. MATTESON,
E. J. RICE.